Jan. 29, 1929.
W. S. BOOTH
1,700,117
RIDGING MACHINE
Filed Jan. 26, 1927
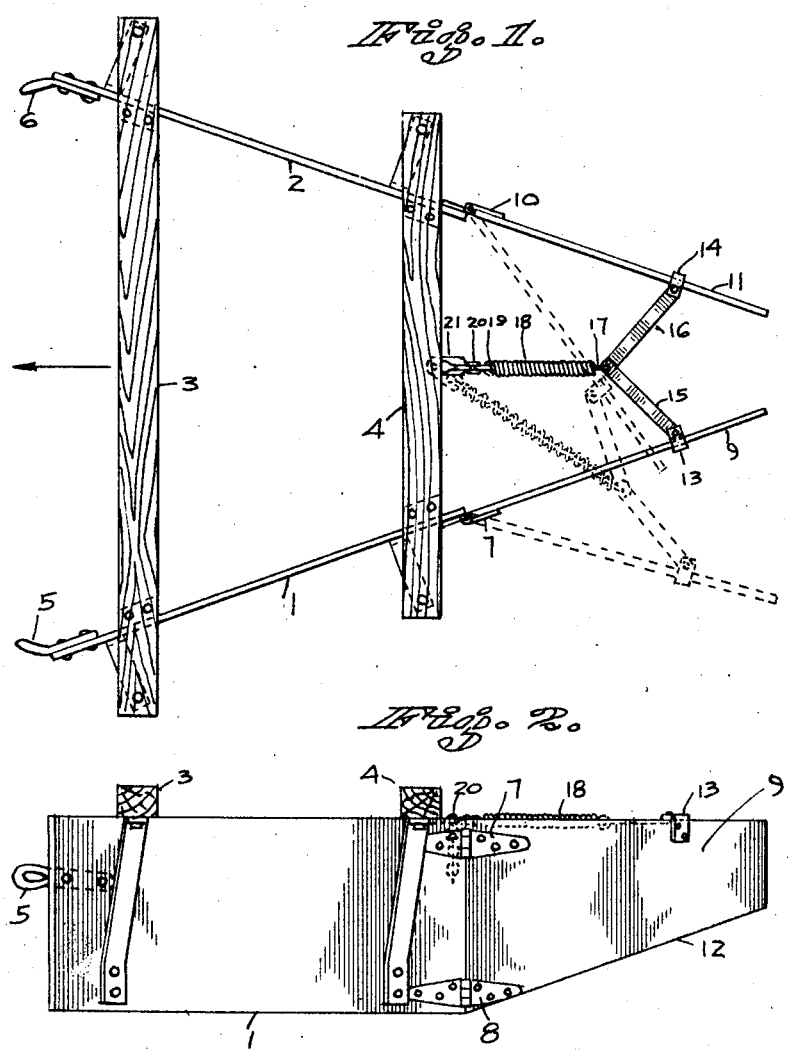
INVENTOR
WILLIAM S. BOOTH
BY
ATTORNEYS Patented Jan. 29, 1929.

1,700,117

UNITED STATES PATENT OFFICE.

WILLIAM S. BOOTH, OF MOUNTAIN VIEW, CALIFORNIA.

RIDGING MACHINE.

Application filed January 26, 1927. Serial No. 163,741.

This invention relates to improvements in ridging devices, such as are used to block off land for irrigating purposes and has as its object the introduction of an implement that is capable of adjustment for different soils, uses less horsepower per work accomplished, and performs work not now possible with the present implements.

In ridging soil it has been found from practice that certain devices that will work in one kind of soil are impractical in another. for instance, a device made for ridging black adobe soil will not work satisfactorily in sandy loam. One object of this invention is to overcome this objection.

Further than this is the objection that corners cannot be found with the long ridges now in use, and must necessarily be built up by hand.

A still further objection is the amount of horsepower necessary to operate the present type of ridger.

To overcome these objectionable features I have designed and reduced to practice a new type of ridger of which the following is a specification and in which:

Figure 1 is a top plan view of the implement; and

Figure 2 is a side elevation of the same.

Referring to the drawings, 1 and 2 are the stationary sides held in the form of a V by cross bars 3 and 4. Fastened to 1 and 2 respectively are rings 5 and 6, which may be used to hook the implement to some motive power not shown. Fastened to the rearward converging ends of 1 by hinges 7 and 8 is a tail piece 9 the bottom part of which is cut away in an upward and rearward direction, as at 12. Also fastened in like manner with hinge 10 to the side 2 is a similar tail piece 11 cut away in the same shape at the bottom.

Fastened to tail pieces 9 and 11 are small brackets 13 and 14 respectively, to which are pivoted connecting bars 15 and 16. These connecting bars are brought together and pivotally held by hook 17 which is an integral part of a spring 18. On the other end of 18 is another hook 19, which is connected into a chain 20. The purpose of this chain is to lengthen or decrease the distance between cross bar 4 and hook 17, thus causing the tail pieces 9 and 11 to separate or come together and still retain the spring 18 in a normal tension. To accomplish this a pear shaped link 21 is pivotally fastened to cross bar 4.

It will thus be seen that the tail piece may be opened and still be free to swing as in the dotted position, regardless of the adjustment of the chain. This would be an adjustment made where the soil was soft and where a bigger ridge was desired.

The cut away portion 12 is not new but makes a ridge with a large base and comparatively small top. If the sides of the ridger were not cut as I cut them, the rear end of the tool in making turns, would knock down the banks to a certain extent. The hinging of the rear portions of the sides at the point where the cut-out begins minimizes this defect.

By introducing the spring 18 a compensating effect is obtained. The tail pieces 9 and 11 may spread and allow a large obstruction to pass through, this preventing clogging. If the soil is loose the parts 9 and 11 would spread and a higher ridge be formed. If this were not desirable the chain 20 could be let out, thus causing the tail piece to spread normally, form a lower ridge and require less draw bar pull than in the case of the sides being rigid. In the case of plenty of loose soil being available the wider the tail pieces are spread, within the range of adjustment provided, the larger and better will be the banks formed. In going from comparatively loose soil to harder soil, the compensating action of the spring would make a ridge of uniformly the same height but of varying thickness without any adjustment. This is essential to irrigating in blocks.

Having set forth my invention in the foregoing specification and accompanying drawings, it is understood that all modifications and refinements that do not depart from the spirit of the drawings and specification I am entitled to use.

I claim:

1. A ridging device comprising two rigid converging sides substantially upright, means for securing said sides, a truncated apex consisting of two substantially upright sides, hinges connecting said apex to the rigid sides, links pivotally connected to the sides of said apex, a spring one end of which pivotally connects the other ends of said links, a chain connected to the other end of said spring, means for adjusting the length of the chain.

2. In a ridging machine of the character described, two fixed blades converging rearwardly, extensible blades hinged to the fixed blades for movement in a horizontal plane, a collapsible connection between the extension blades and resilient means active on the connection.

3. In a ridging machine of the character described, two scraper blades, beams mounted thereover and holding the same in spaced and converging relation, extension blades hinged to the rear ends of the first blades for movement in a horizontal plane, a collapsible connection between the extension blades and a resilient connection between the former connection and one of the beams.

4. In a ridging machine of the character described, two fixed blades converging rearwardly, extension blades hinged to the fixed blades and a connection between the extension blades causing one to be affected by movements of the other, and means for adjusting the normal relation between the blades.

WILLIAM S. BOOTH.